US010243885B2

(12) United States Patent
Wang et al.

(10) Patent No.: US 10,243,885 B2
(45) Date of Patent: Mar. 26, 2019

(54) METHOD FOR COMPLEX COLORING BASED PARALLEL SCHEDULING FOR SWITCHING NETWORK

(71) Applicant: Shanghai Jiao Tong University, Shanghai (CN)

(72) Inventors: Lingkang Wang, Shanghai (CN); Tong Ye, Shanghai (CN); Tony T. Lee, Shanghai (CN); Weisheng Hu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 60 days.

(21) Appl. No.: 15/083,163

(22) Filed: Mar. 28, 2016

(65) Prior Publication Data

US 2017/0195258 A1  Jul. 6, 2017

(51) Int. Cl.
*H04L 12/935* (2013.01)
*H04L 12/937* (2013.01)

(52) U.S. Cl.
CPC ........ *H04L 49/254* (2013.01); *H04L 49/3018* (2013.01)

(58) Field of Classification Search
CPC ............. G06F 17/30958; H04L 1/0042; H04L 5/0037; H04L 12/56; H04L 12/5693; H04L 16/28; H04L 27/2601; H04L 47/28; H04L 47/50; H04L 49/40; H04L 49/101; H04L 49/205; H04L 49/254; H04L 49/255; H04L 49/1576; H04L 2012/5649; H04L 2012/5675; H04L 2012/5679; H04W 16/28; H04W 28/26; H04W 28/0268; H04W 52/20; H04W 52/46; H04W 52/265; H04W 72/044; H04W 72/082; H04W 72/087; H04W 72/0446; H04W 72/1236; H04W 84/12; H04W 88/16

See application file for complete search history.

(56) References Cited

U.S. PATENT DOCUMENTS 5,495,356 A * 2/1996 Sharony
2014/0119347 A1 * 5/2014 Szymanski

* cited by examiner

*Primary Examiner* — Marsha D Banks Harold
*Assistant Examiner* — Dharmesh J Patel
(74) *Attorney, Agent, or Firm* — Mei & Mark LLP; Manni Li (57) ABSTRACT

Method for complex coloring based parallel scheduling for the switching network that is directed at traffic scheduling in the large scale high speed switching network. The parallel scheduling algorithm is on a frame basis. By introducing the concept of complex coloring which is optimal and can be implemented in a distributed and parallel manner, the algorithm can obtain an optimal scheduling scheme without knowledge of the global information of the switching system, so as to maximize bandwidth utilization of the switching system to achieve a nearly 100% throughput. The algorithm complexity is $O(\log^2 N)$.

2 Claims, 7 Drawing Sheets

METHOD FOR COMPLEX COLORING BASED PARALLEL SCHEDULING FOR SWITCHING NETWORK

CROSS-REFERENCE AND RELATED APPLICATION

The subject application claims priority on Chinese patent application CN201511027634.7 filed on Dec. 31, 2015. The contents and subject matters of the Chinese priority application is incorporated herein by reference.

FIELD OF INVENTION

The present invention relates to switching network techniques, and in particular relates to a method for complex coloring based parallel scheduling for the switching network and use of the algorithm thereof.

BACKGROUND OF INVENTION

With the quick development of new broadband applications in recent years, higher requirements are demanded for transmission and processing of massive information, where the switching network plays an important role. Be it in a traditional network, such as a metropolitan backbone network, or in new types of networks represented by the data center, the switching network plays a crucial role.

Properties of the switching network primarily depend on the traffic scheduling method. The explosive growth of network information has resulted in ever more number of switching ports and ever higher rates thereof, thus renders it ever more difficult for real time collection of information of all the ports. Hence, the design of a traffic scheduling method primarily faces the following challenges and requirements:

(1) Scalability: a good scheduling method needs to satisfy an ever expanding trend of the scale of the switching network;

(2) High throughput: a good scheduling method needs to enable maximum utilization of bandwidth resources and high throughput capacity of the switching network;

(3) Distributed and parallel operations: a good scheduling method needs to minimize cost for collecting port information and to reduce computation complexity.

To meet the afore-mentioned requirements, current scheduling methods for the switching network are categorized as follows:

The first category is the maximum size matching (MSM) algorithm. The basic idea of a MSM algorithm is to maximize the connection number of the input and output ports at each timeslot, so as to make maximum utilization of real time bandwidth. Currently, computation complexity for algorithms in the category is $O(N \log N)$, and thus the scalability thereof is not good. In addition, under non-uniform traffic load, the algorithms in the category may result in system instability. While in actual systems, the majority of service flows are non-uniform. Therefore, algorithms in the category do not satisfy the requirements of current switching networks.

The second category is the maximum weight matching algorithm. In view of the defects of the MSM algorithm, an algorithm in the category takes into account real time data information in the system, such as the queue length or the waiting time of the head-of-line packet of each VOQ. In this way, a scheduling algorithm makes further use of more valid information, and provide a high performance under both uniform and non-uniform traffic loads. However, computation complexity for the algorithm in the category is high, generally being $O(N^2 \log N)$. Therefore, algorithms in the category have poor scalability and do not satisfy the requirements for the switching network.

The third category is the batch scheduling algorithm. A range of consecutive timeslots is stipulated in an algorithm of the category, called a frame. In contrast to the previous two categories of algorithms where the traffic packets are scheduled within each timeslot, a batch scheduling algorithm operates with a frame as a unit and schedules packets within a frame. In this way, the algorithm has a low amortized computational complexity per timeslot, while the traffic statistical characteristics within a given frame are made full use of. However, currently existing algorithms in the category do not realize distribution while reducing the computational complexity in the mean time.

The fourth category is the quasi-static scheduling algorithm. Algorithms in the category emerge in response to avoiding online computation while providing the bandwidth guarantee for each input/output pair. The algorithms are primarily based on the Birkhoff-von Neumann (BvN) decomposition. The scheduling algorithm guarantees the capacity assigned for each input-output pair by the repeated executions of a set of predetermined connection patterns, which are calculated from the average loading of all input-output pairs subject to the fixed total switching capacity. Furthermore, connection patterns are recalculated according to the new matrix when the service matrix substantially changes. A quasi-static scheduling algorithm may achieve 100% throughput with low online computational complexity under smooth traffic. However, when the traffic matrix is fluctuated, the complexity of BvN decomposition is $O(N^{4.5})$, which gives the system a high computational burden.

SUMMARY OF THE INVENTION

The present invention provides a method for complex coloring based parallel scheduling for the switching network, which is directed at traffic scheduling in the high speed switching network. The algorithm may be implemented in a fast, distributed, and parallel manner, which may achieve a nearly 100% throughput under both uniform and non-uniform traffic, to adapt for the development requirement of high speed switching networks in the big data era.

The present invention is based on the principle that a traffic scheduling issue in the switching network is solved by formulating it to an edge coloring issue in a bipartite graph; by introducing the concept of complex color, a fast and parallel scheduling method is proposed. Without loss of generality, we consider a N×N input-queued switching structure in this document. Confined by the switching structure, each input port may at most send a data cell at each timeslot, while each output port may at most receive a data cell. The present scheduling method adopts a batch scheduling methodology, that is, a timeslot period forms a frame, and data cells within a frame are scheduled as a whole. The whole scheduling process may be executed in a pipeline manner. While a scheduling scheme for the kth frame is being computed, the data cells for the (k+1)th frame are being accumulated, and data cells for the (k−1)th frame are sent to the corresponding output ports according to the computed scheme.

The present invention provides a method for complex coloring based parallel scheduling for the switching network, comprising the following steps:

Step 1: Mapping the N×N input-queued switching structure to a bipartite graph $G_k=(V\cup U,E)$ according to the kth packet frame, wherein each input port may send at most a data cell for each timeslot, a period of packets being that of one said frame; with a vertex $v_i \epsilon V$ representing the input port i, and a vertex $u_j \epsilon U$ representing the output port j, an edge $e_m(v_i,u_j)\epsilon E$ representing the mth data cell from the input port i destined to the output port j, and mapping the timeslots for scheduling to a color set $C=\{c_1,c_2, \ldots, c_\Delta\}, i,j=1,2,\ldots,N$, wherein the color stands for a timeslot to sending packets in the next time frame and $\Delta$ is the maximum vertex degree for all the vertexes;

Step 2: Splitting each said edge $e_m(v_i,u_j)\epsilon E$ of the bipartite graph to a pair of links, and coloring each said link by the vertex connected thereto to ensure that the links connected to each said vertex are differently colored, which is called a consistent coloring of the bipartite graph; performing color exchange operations on the vertexes to finally obtain a proper coloring scheme satisfying the following two requirements: two links belonging to the same edge are identically colored, while edges with the same vertex are colored differently;

Step 3, for data cell transmission: successively setting up connections between corresponding input ports and output ports for sending corresponding data packets in accordance with the edge colored by the corresponding color in the coloring scheme obtained in step 2 at each timeslot.

In the present invention, the rules for coloring the link and for the color exchange in step 2 are:

Assigning the color used in $G_{k-1}$ to the link if a link is both in $G_k$ and $G_{k-1}$; otherwise assigning the first available color in a current color set;

Continuing until each said edge is assigned a color pair, named as complex coloring: colored edges whose corresponding links are colored identically are called constants, and are called variables otherwise; arbitrarily exchanging colors of two said links connected to the same vertex so that the variables may walk along the corresponding two-colored path and hit each other to be eliminated. If the vertex has no corresponding link to exchange the color with the variable, assigning the variable a required color, and a proper coloring of a bipartite graph is obtained when all the variables are eliminated; if a few variables are not eliminated within a set maximum running time, leaving the uncolored variables to the next frame for recoloring.

In comparison with the current technology, the present invention has the following beneficial effects:

(1) Batch scheduling issue is transformed to a coloring issue in a bipartite graph with introduction of complex color concept, so that a proper coloring solution with minimum number of colors is obtained to obtain ultimately an optimized scheduling solution. Hence, system bandwidth is optimally utilized to achieve a nearly 100% throughput for the switching system.

(2) By applying parallel characteristics of the complex color, each input port and output port can make full use of local information, so that computational complexity is substantially reduced for the present scheduling algorithm. The present invention has a computational complexity of $O(\log^2 N)$ with a frame length selected as $O(\log N)$ and an amortized complexity of $O(\log N)$. Therefore, the present invention obtains an optimized scheduling solution quickly and effectively.

(3) By using the batch scheduling method, statistical characteristics of the traffic load is effectively reflected. Thus, the present invention remains stable for both uniform traffic and non-uniform traffic.

BRIEF DESCRIPTION OF THE DRAWINGS

FIG. 1 contains schematic diagrams showing a switching system vis-à-vis a bipartite graph: FIG. 1(*a*) shows a N×N switching fabric structure; and FIG. 1(*b*) shows the corresponding bipartite graph $G_k$.

FIG. 2 contains schematic diagrams depicting the process of bipartite coloring based on complex coloring: FIG. 2(*a*) shows the proper coloring scheme corresponding to the (k−1)th frame, $G_{k-1}$; FIG. 2(*b*) shows the consistent coloring scheme corresponding to the kth frame, $G_k$; and FIG. 2(*c*) shows the proper coloring scheme corresponding to the kth frame, $G_k$.

FIG. 4 contains schematic diagrams showing the processing of the scheduling algorithm based on complex coloring for a 3×3 switching structure: FIG. 4(*a*) shows a 3×3 switching fabric structure; FIG. 4(*b*) shows the bipartite graph model corresponding to the kth frame, $G_k$; FIG. 4(*c*) shows the proper coloring scheme corresponding to the (k−1)th frame $G_{k-1}$; and FIG. 4(*d*) shows the consistent coloring scheme corresponding to the kth frame, $G_k$.

FIG. 5 contains schematic diagrams showing a variable elimination process corresponding to a 3×3 switching structure based on complex colors: FIG. 5(*a*) shows the consistent coloring scheme corresponding to the kth frame, $G_k$; FIG. 5(*b*) shows the variable elimination process in (1), (2), (3), and (4); and FIG. 5(*c*) shows the proper coloring scheme corresponding to the kth frame, $G_k$.

DETAILED DESCRIPTION OF THE INVENTION AND EMBODIMENTS

In combination with drawings and embodiments hereunder provided, the present invention is further enunciated, but it shall be understood that the present invention is only illustrated thereby, rather than being restricted of its scope of invention. The present invention, upon reading by a person of the art, is susceptible to equivalent modifications thereby, which shall fall within the scope of the accompanying claims.

A N×N switching network, having N input ports and N output port, has an input buffer queue for each input port. A bipartite graph $G=(V\cup U,E)$ has two disjoint vertex sets V and U, wherein E is an edge set of the bipartite graph, and two vertexes $v_i$ and $u_j$ associated with an arbitrary edge $e(v_i,u_j)\epsilon E$ belong respectively to the vertex sets V and U.

Figures 1, 1A, 1B:
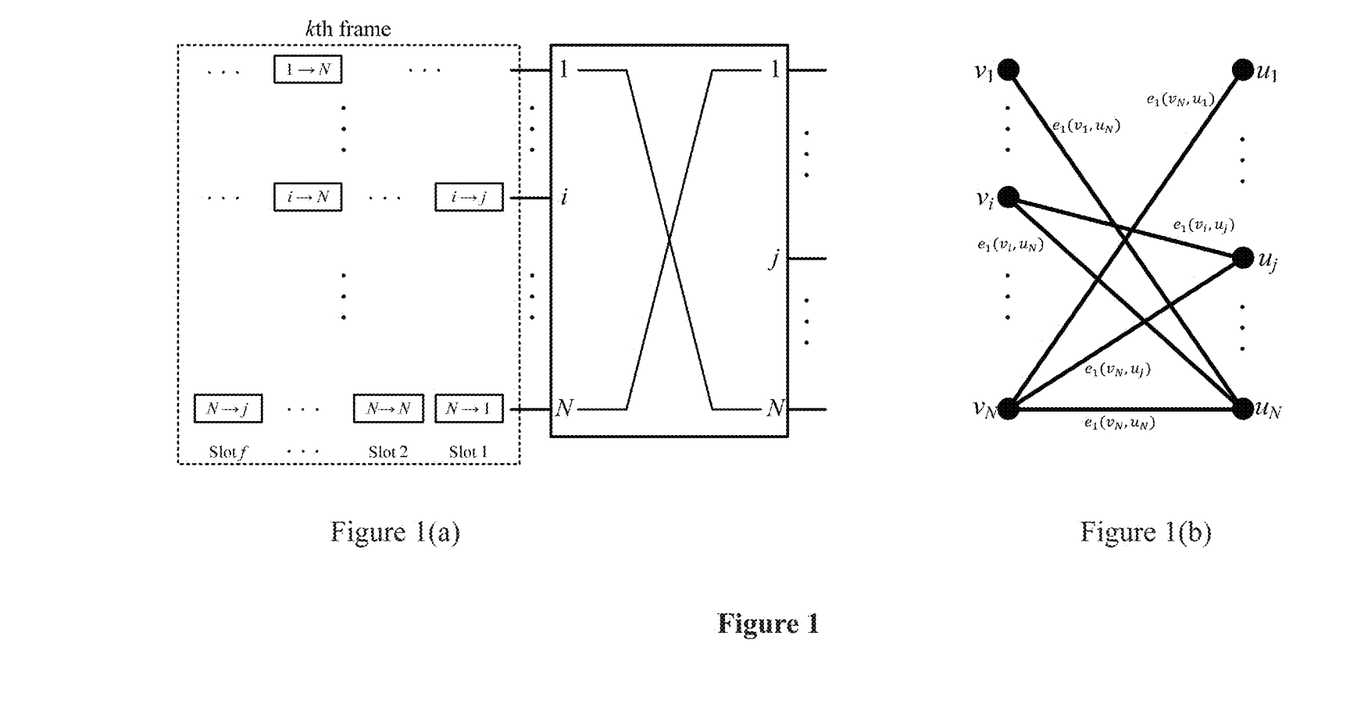
Figure 7:
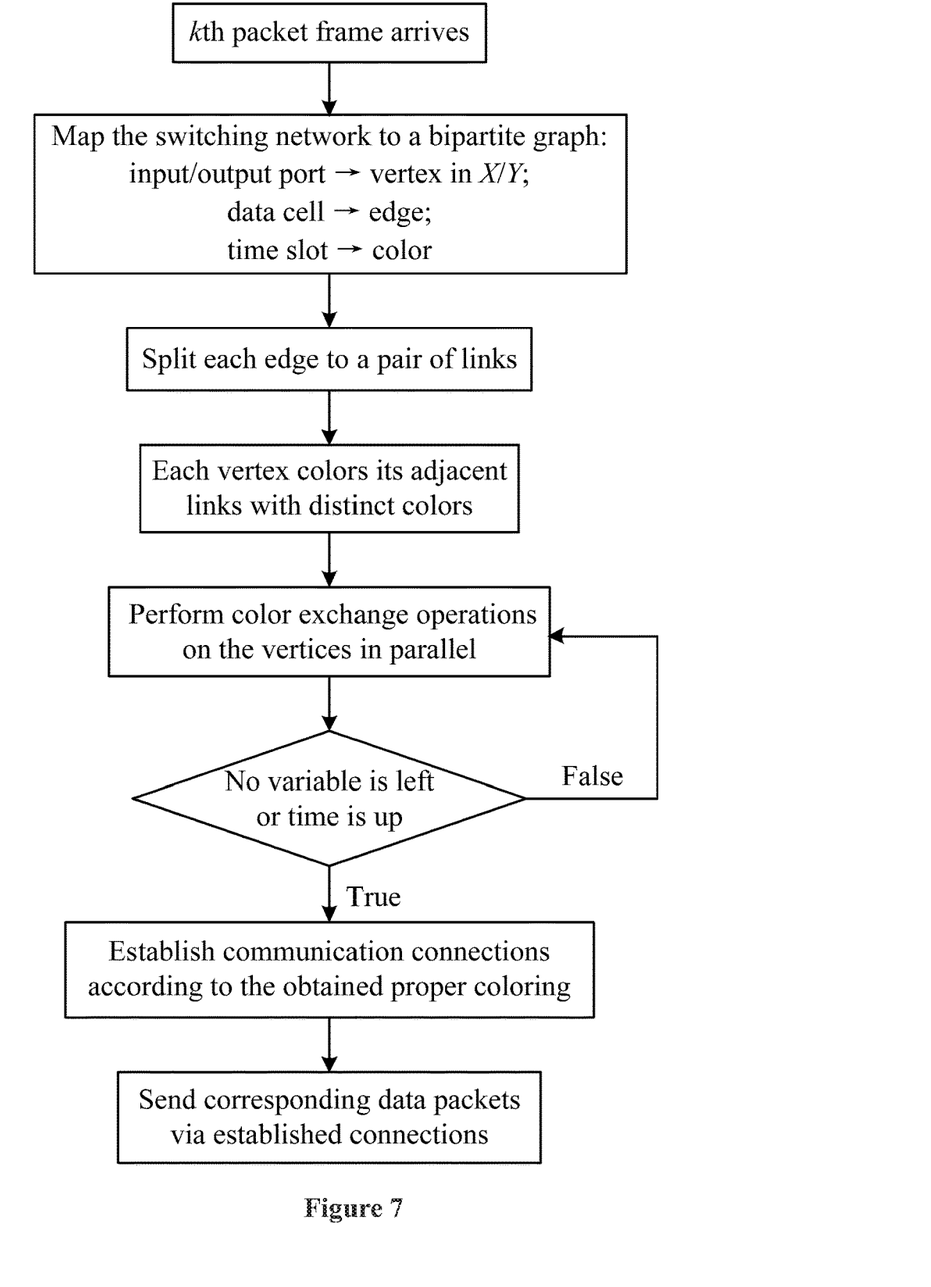
FIG. 7 is a flow chart depicting the operation of the method for complex coloring based parallel scheduling for switching network of the claimed invention.

The present invention comprises 3 steps, and detailed operation is shown in the flow chart of FIG. 7:

(1) Scheduling initiation: first, as show in FIG. 1, mapping the N×N switching network to a bipartite graph $G_k=(V\cup U, E)$ according to a kth frame, as shown in the first and second blocks from the top in FIG. 7, wherein a vertex $v_i \epsilon V$ representing an input port i, a vertex $u_j \epsilon U$ representing an output port j, an edge $e_m(v_i,u_j) \epsilon V$ representing the mth data cell going from the input port i to the output port j, wherein $i,j=1,2, \ldots, N$, $m \epsilon \{1,2, \ldots, f\}$.

Figures 2, 2A, 2B, 2C:
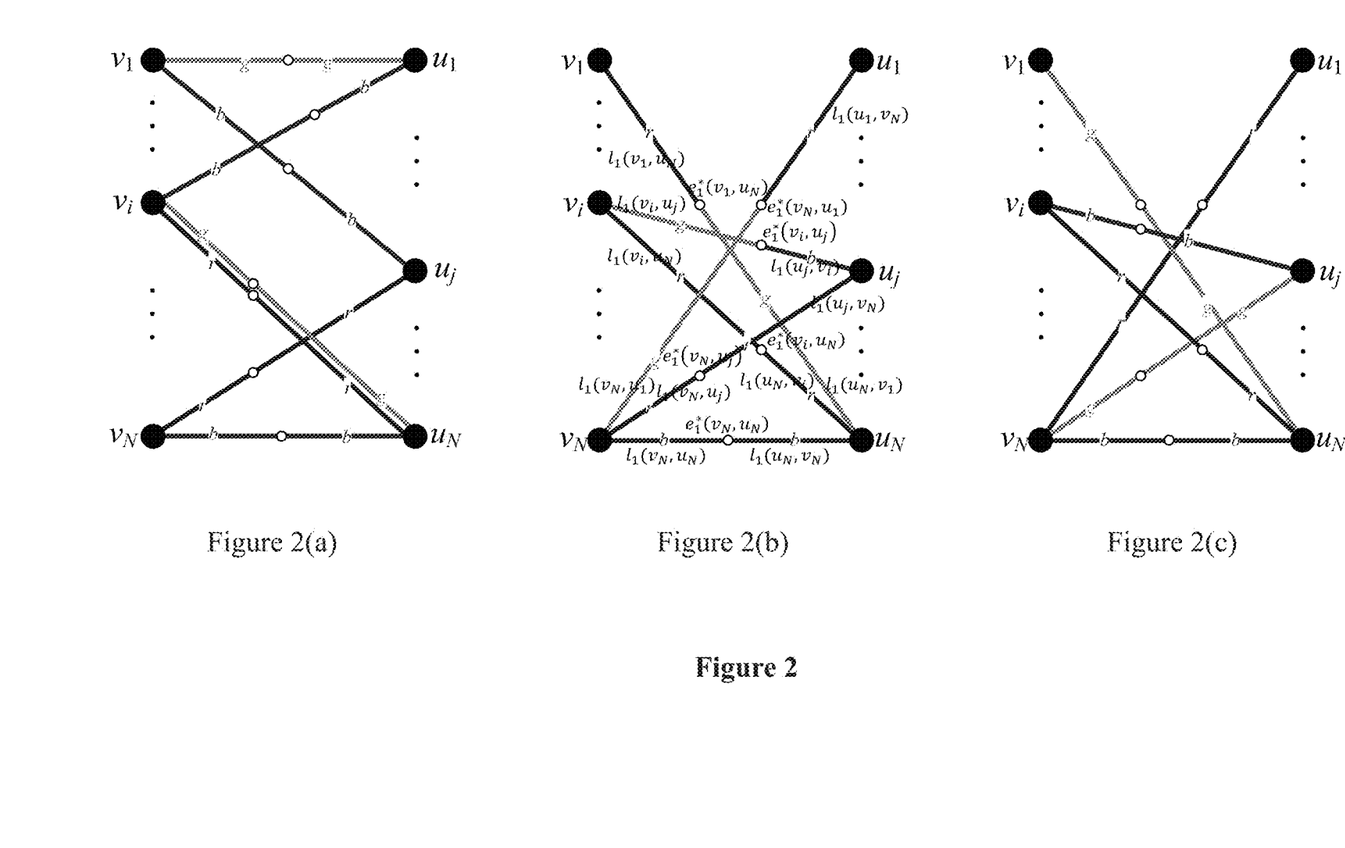
Figure 3:
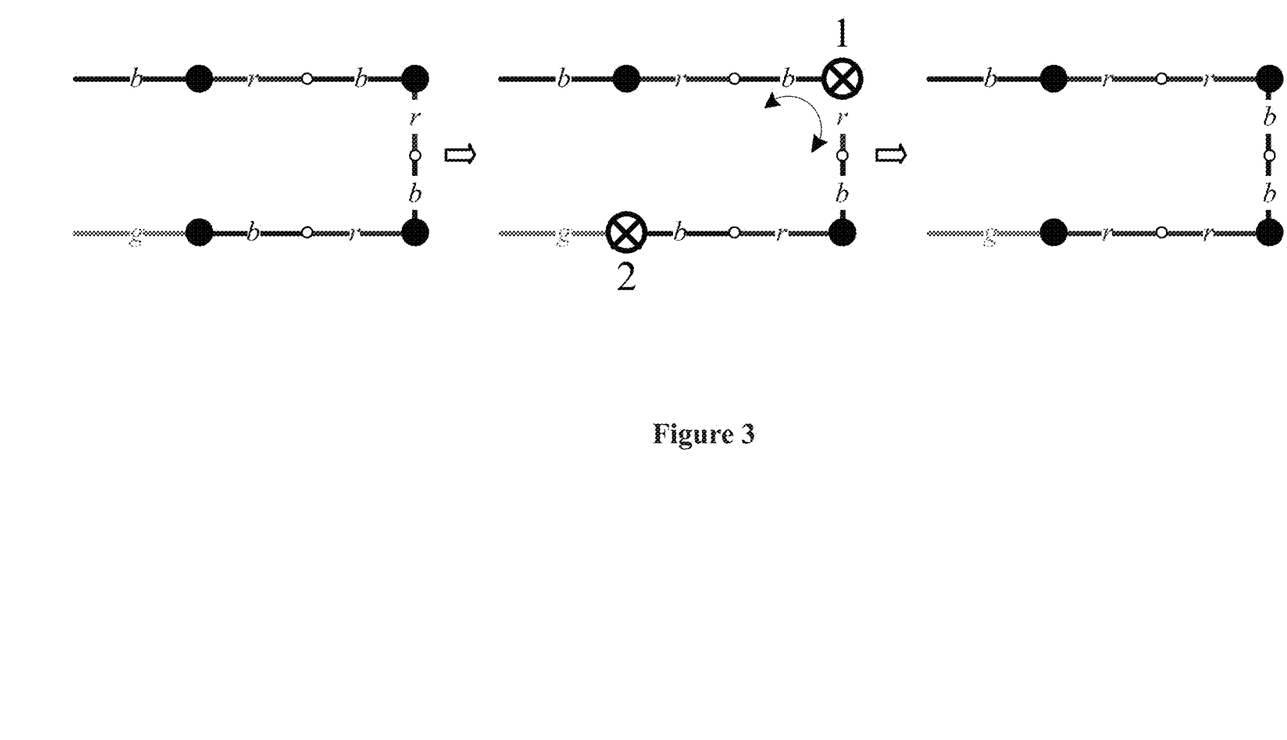
FIG. 3 is a schematic diagram showing the variable elimination process based on complex coloring.

(2) Edge coloring of the bipartite graph: for any $e_m(v_i,u_j)\epsilon E$ each of all the edges in the bipartite graph is split into a pair of links $l_m(v_i,u_j)$ and $l_m(u_j,v_i)$, as shown in FIG. 2(*b*)

and the third block from the top in FIG. 7. Input ports and output ports respectively color links which are incident to them, so as to ensure that links connected to the same vertex are differently colored to obtain a consistent coloring scheme of $G_k$ as shown in the fourth block from the top in FIG. 7. As shown in the fifth and sixth blocks from the top and logic loop in FIG. 7, the color exchange operations are performed and the specific rule for coloring is as follows: if there exists a link in both $G_k$ and $G_{k--1}$, assign the color used in $G_{k--1}$ to the link; otherwise, assign the first available color in the current color set. As show in FIGS. 2(a) and 2(b), the link $l_1(v_i, u_N)$ is adjacent to the vertex $v_i$, and exists in both $G_k$ and $G_{k--1}$. Hence $l_1(v_i, u_N)$ is assigned the color thereof in $G_{k--1}$. While $l_1(v_i, u_j)$ exists only in $G_k$, and is thus assigned the first available color in the current color set. Instead of assigning one color in color set to each edge, the present invention assigns a color pair, or a complex color, to each edge of $G_k$, that is one color for each link. The colored edge is a constant if its corresponding links are colored identically, for example, the $e_1(v_i, u_N)$ shown in FIG. 2(b). Otherwise, the colored edge is called a constant, for example, the $e_1(v_i, u_j)$ shown in FIG. 2(b). The colors of arbitrary two links connected to the same vertex can be exchanged by the vertex. For example, vertex 1 exchange the colors of its two adjacent links as shown in FIG. 3. In this manner, the variables can walk along the corresponding two-colored path and hit each other to be eliminated. If the vertex has no correspond link to exchange the color with the variable, the variable is assigned the desired color, as shown in the vertex 2 in FIG. 3. Finally, all the variables are eliminated and a proper coloring of the bipartite graph is obtained, as shown in FIG. 2(c). If few variables are not eliminated within a set maximum running time, leave the uncolored variables to the next frame for recoloring.

(3) Data cell transmission: as shown in seventh and eighth blocks from the top in FIG. 7, successively setting up connections between corresponding input ports and output ports for sending corresponding data packets in accordance with the edge colored by the corresponding color in the coloring scheme obtained in step 2 at each timeslot.

EXAMPLES

Figures 4, 4A, 4B, 4C, 4D:
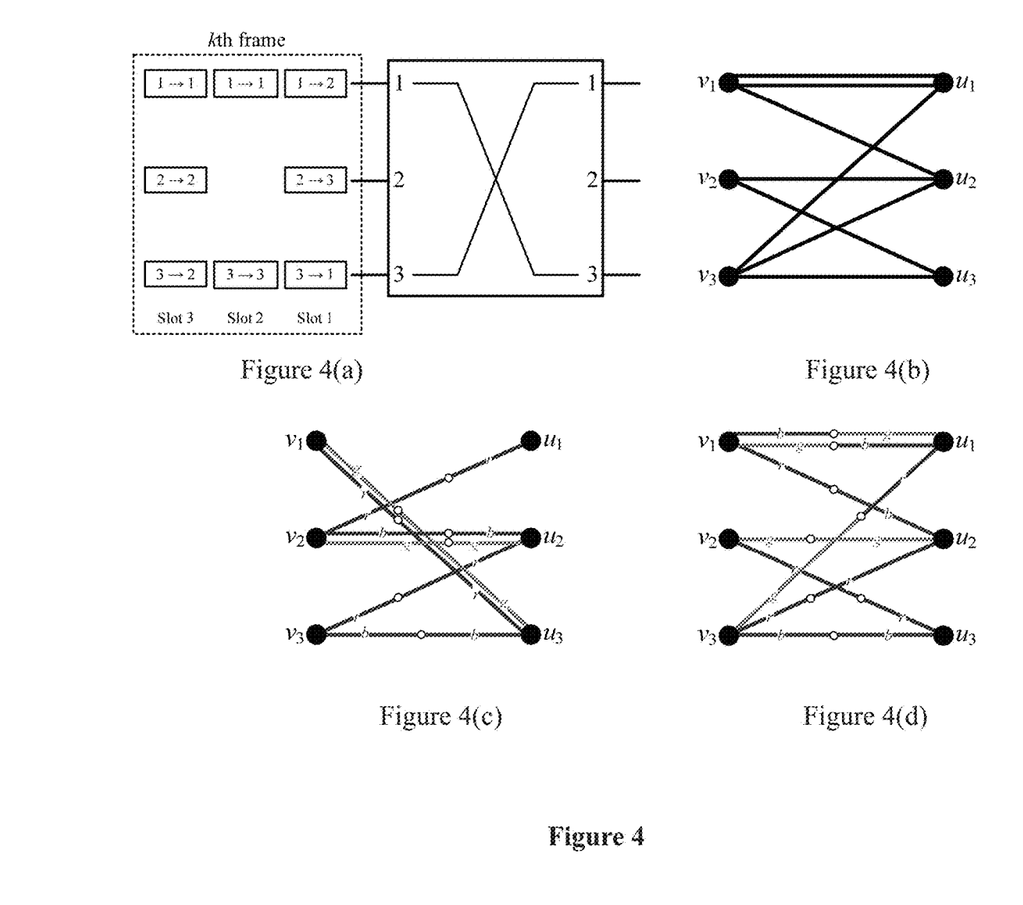

A scheduling process with a specific traffic load with a frame length of 3 and a 3×3 switching structure would comprise the following steps:

(1) Map the 3×3 switching network, as show in FIG. 4(a), to a bipartite graph $G_k$, as show in FIG. 4(b), according to a kth frame. Wherein the vertex $v_i \in V$ represents an input port i, a vertex $u_j \in U$ represents an output port j, the edge $e_m(v_i, u_j) \in E$ represents the mth data cell going from the input port i to the output port j, wherein i, j=1,2,3,m∈{1,2,3}. For example, the input port 1 has a data packet to be sent to the output port 2, and thus there exists an edge $e_1(v_1, u_2)$ between the vertexes $v_1$ and $u_2$.

Figure 5A:
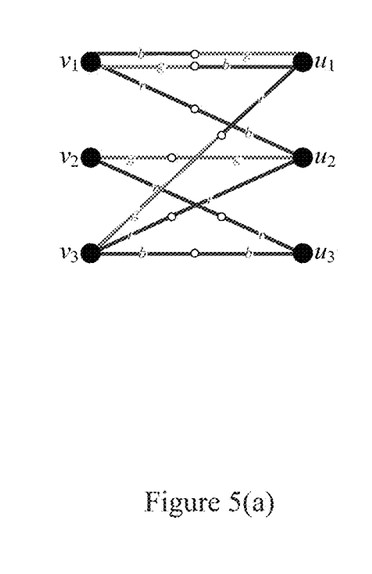
Figure 5B:
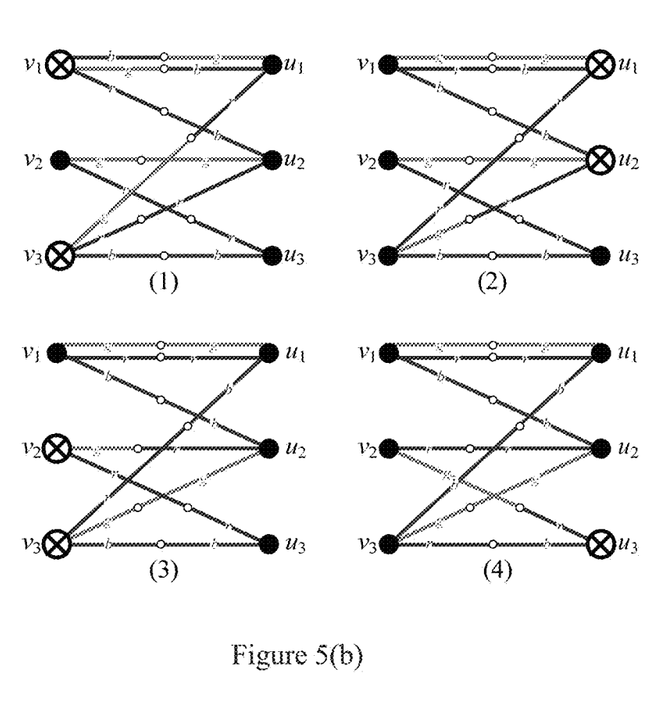
Figure 5C:
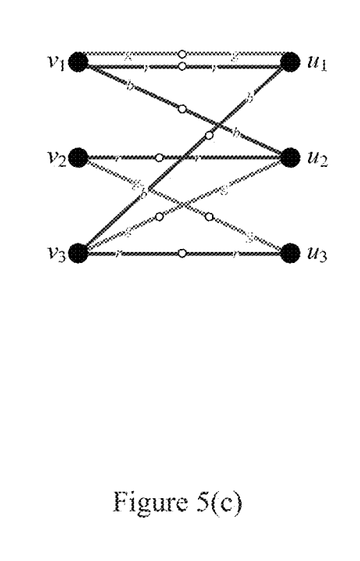

(2) Split each edge in $G_k$ to a pair of links. Input ports and output ports respectively color links which are incident to them, so as to ensure that links connected to the same vertex are differently colored, which is called a consistent coloring of the bipartite graph. As shown in FIGS. 4(c) and 4(d), both $e_1(v_2, u_2)$ and $e_1(v_3, u_3)$ exist on graphs $G_{k--1}$ and $G_k$, and thus the coloring scheme in $G_{k--1}$ is used for both edges. On the other hand, $e_1(v_1, u_2)$ does not exist in $G_{k--1}$, and thus the links $l_1(v_1, u_2)$ and $l_1(u_2, v_1)$ are colored with their respective available smallest colors of the respectively corresponding vertexes $v_1$ and $u_2$. This applies similarly for other edges, until an initial coloring scheme is obtained as shown in FIG. 4(d), wherein there are 4 variables. To eliminate the 4 variables, vertexes in the vertex sets V and U execute alternatively the color exchange operations, as shown in FIG. 5(b). First, the vertexes $v_1$ and $v_3$ connected with the variables are simultaneously executed with the color exchange operation, as shown in FIG. 5(b)-(1). Subsequent to the operations of the vertex set V, the vertexes $u_1$ and $u_2$ connected with the variables in the vertex set U also simultaneously execute the color exchange operations, as shown in FIG. 5(b)-(2). Continue the alternative operations until all the variables in the graph are eliminated. Ultimately, we obtain a proper coloring scheme, as shown in FIG. 5(c).

Figure 6:
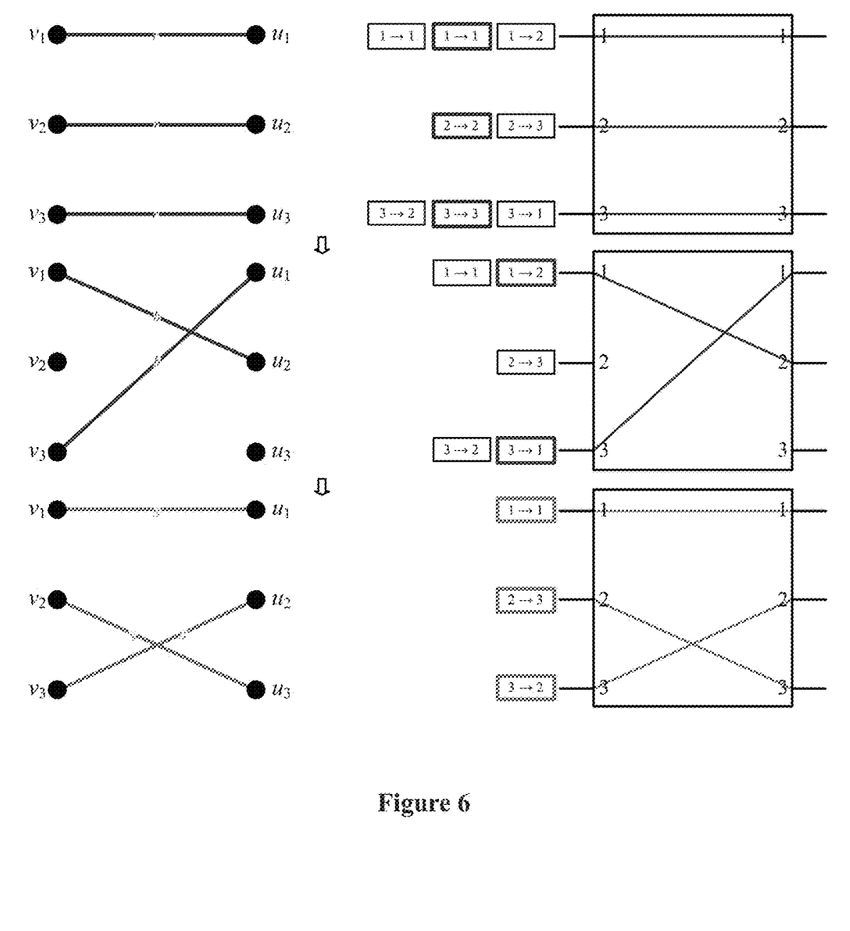
FIG. 6 is a schematic diagram showing a scheduling scheme obtained by the present invention for a 3×3 switching structure with the frame length of 3.

(3) Successively set up communication connections with corresponding input ports and output ports for sending corresponding data packets in accordance with the coloring scheme obtained in step 2 and according to the timeslots corresponding to the colors. As shown in FIG. 6, the color r corresponds to the first timeslot for the next frame. Therefore, a connection is set up for input ports and output ports corresponding to every edge with color r. That is to say, at the first timeslot for the next frame, the input port 1 sends data to output port 1, the input port 2 sends data to output port 2, and the input port 3 sends data to output port 3. This applies similarly for other timeslots.

We claim:

1. A method for complex coloring based parallel scheduling for a switching network, comprising:
   providing a N×N switching network having N input ports and N output ports, each of the N input ports being provided with an input buffer queue and sending at most one data cell in a timeslot, and each of the N output ports receiving at most one data cell in the timeslot at the same time, and a period of the timeslot f is a frame,
   mapping the N×N switching network to a bipartite graph $G_k = (V \cup U, E)$ based on data cells of a kth frame having a vertex $v_i \in V$ representing one of the input ports i, a vertex $u_j \in U$ representing one of the output ports j, and an edge $e_m (v_i, u_j) \in E$ representing an mth data cell going from the input port i to the output port j,
   mapping timeslots for scheduling to a color set $C=\{c_1, c_2, \ldots, c_\Delta\}$, i, j=1, 2,..., N, while $\Delta$ being the maximum vertex degree of all the vertexes,
   splitting each of all the edges $e_m (v_i, u_j) \in E$ of the bipartite graph to a pair of links, and coloring each of the links by the vertex connected thereto to ensure that the links connected to the same vertex are colored differently, which is called a consistent coloring of the bipartite graph,
   performing color exchange operations on the vertexes to obtain a proper coloring scheme where the color of the two links belonging to the same edge are identically colored and all the edges connected to the same vertex are differently colored, and
   successively setting up communication connections with corresponding input ports and output ports and sending corresponding data packets for data cell transmission after the proper coloring of the bipartite graph is obtained, where the connection pattern of the switch in the timeslot is determined by a set of edges with the color corresponding to the current timeslot.

2. The method for complex coloring based parallel scheduling for the switching network of claim 1, wherein rules for coloring the links and for the color exchange are:

if the link is in $G_k$ as well as $G_{k-1}$, coloring it with the corresponding color of that in the proper coloring of $G_{k-1}$; otherwise, coloring it with the first available color in the color set of the end vertex;

continuing to assign colors to the links until each of the edges is assigned a pair of color to the pair of the links, named as a complex coloring, a constant being the two links corresponding to the same edge having the same color and a variable being the two links corresponding to the same edge having different colors, arbitrarily exchanging the colors of the two links connected to the same vertex, so that the variables walk on the corresponding two-colored path such that they hit each other and are eliminated eventually, and if the vertex has no corresponding link to exchange the color with the variable, assigning the variable with a required color and a bipartite graph is obtained when all the variables are eliminated; if a few variables are not eliminated within a setting maximum time limit, leave the variables to the next frame for rescheduling.

\* \* \* \* \*

UNITED STATES PATENT AND TRADEMARK OFFICE
CERTIFICATE OF CORRECTION

PATENT NO. : 10,243,885 B2
APPLICATION NO. : 15/083163
DATED : March 26, 2019
INVENTOR(S) : Wang et al.

It is certified that error appears in the above-identified patent and that said Letters Patent is hereby corrected as shown below:

On the Title Page

Left column, Line 19, between the item of "(65) Priority Publication Data" and "(51) Int. Cl.," insert the following item on the data of the foreign priority application:
-- (30) Foreign Application Priority Data
Dec. 31, 2015 (CN) ........................................................................ 201511027634.7 --

Signed and Sealed this
Third Day of September, 2019

Andrei Iancu
*Director of the United States Patent and Trademark Office*